N. H. BORGFELDT.
Tobacco-Stem Flattener.
No. 200,246. Patented Feb. 12, 1878.
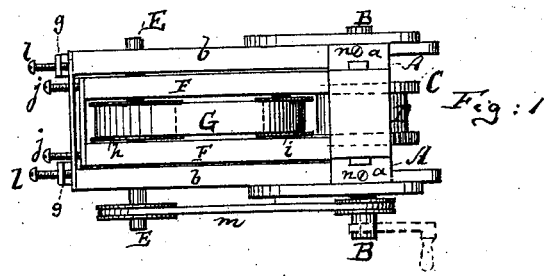
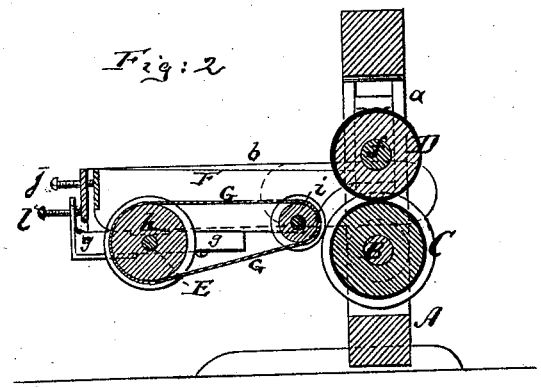
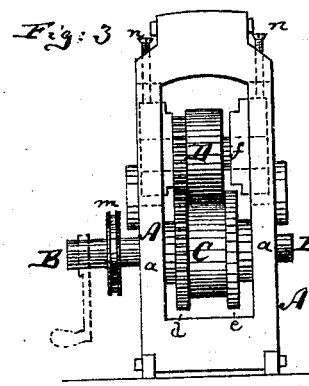
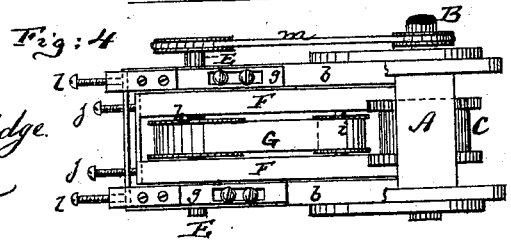
Witnesses:
John C. Tunbridge.
A v Briesen
Inventor:
N. H. Borgfeldt
by his attorney
A v Briesen

UNITED STATES PATENT OFFICE.

NICHOLAS H. BORGFELDT, OF NEW YORK, N. Y.

IMPROVEMENT IN TOBACCO-STEM FLATTENERS.

Specification forming part of Letters Patent No. 200,246, dated February 12, 1878; application filed August 4, 1877.

*To all whom it may concern:*

Be it known that I, NICHOLAS H. BORGFELDT, of New York city, in the county and State of New York, have invented a new and Improved Tobacco-Stem Flattener, of which the following is a specification:

This invention relates to a new machine for flattening or pressing the stems of tobacco-leaves and preparing them for the manufacture of cigars and other goods.

The invention consists in the combination of a pressure-roller having two flanges, of which one is toothed, with another pressure-roller carrying a toothed wheel that meshes into the toothed flange of the first roller.

The invention also consists in the general combination of parts, hereinafter more fully pointed out.

In the accompanying drawing, Figure 1 represents a plan or top view of my improved tobacco-stem flattener. Fig. 2 is a vertical longitudinal section of the same; Fig. 3, a front elevation thereof, and Fig. 4 a bottom view of the same.

Similar letters of reference indicate corresponding parts in all the figures.

A represents the frame of the machine, made of wood, metal, or other material, comprising, principally, two vertical posts, $a\ a$, and two horizontal rails, $b\ b$, that project from said posts. In the posts $a$ is hung a shaft, B, to which rotary motion is to be imparted by suitable means, preferably by a crank-handle, indicated by dotted lines in Fig. 3.

Upon the shaft B is mounted, between the two posts $a\ a$, a pressure-roller, C, which has two flanges, $d$ and $e$. D is another pressure-roller, mounted upon a shaft, $f$, which hangs in adjustable bearings above the shaft B, and which is adapted to enter between the flanges $d\ e$ of the roller C, as clearly shown in Fig. 3.

I prefer to make the rollers D C of different diameters, as indicated in Fig. 3, as this gives, in addition to the pressing, a sort of grinding or rubbing motion, and it is evident that, instead of having the flanges on the roller C, they may as well be on the roller D, in which case, however, the roller C would be without flanges. The object of these flanges $d\ e$ is to keep the stems of the tobacco that pass between the rollers from being discharged sidewise—in fact, from leaving the rollers before they have been properly pressed or flattened. One of the flanges is toothed, to mesh into teeth that are formed on the roller D, and I thus utilize one flange for two purposes—to wit, as a means of rotating the roller, and as a guide for the stems to be pressed.

Between the two horizontal rails $b\ b$ of the frame A is supported, in horizontally-adjustable bearings $g\ g$, a shaft, E, which carries a drum, $h$. F is a frame, which is placed between the two rails $b\ b$, and carries, near the rollers C D, a drum, $i$. G is a feed-apron, placed around the drums $h\ i$. It serves to convey the stems to be flattened to and between the two rollers C D.

The tension of the apron G can be adjusted by set-screws $j\ j$, which extend through one end of the frame A against the end of the frame F, as clearly shown in Figs. 1 and 2, and which, when screwed forward, serve to move the frame F, and with it the drum $i$, thereby stretching the apron G.

By set-screws $l\ l$ the bearings $g$ of the shaft E can also be adjusted to properly stretch the belt $m$ that connects the shafts E and B, as shown in Fig. 1.

In view of the fact that the tobacco-stems to be flattened are moistened, it is important that the machine be provided with means for keeping the tension of the apron properly regulated, and also that of the belt that moves it, as these parts are exposed to moisture and liable to shrinkage, which, unless ready means are at hand for counteracting, will be apt to render the machine inoperative. The pressure-roller D is, of course, held in proper contact with the stems to be flattened by suitable set-screws $n\ n$, which are indicated in Fig. 3, and which affect the adjustable bearings of the movable shaft $f$.

I claim as my invention—

1. The combination, in a tobacco-stem flattener, of the pressure-roller C, having two flanges, $d$ and $e$, of which one is toothed, with the pressure-roller D, carrying a toothed wheel that meshes into the toothed flange *d*, substantially as herein shown and described.

2. The combination of the frame A, having side rails *b*, with the adjustable bearings *g*, set-screws *l*, shaft E, belt *m*, shaft B, feed-apron G, and frame F, all arranged to operate substantially as herein shown and described.

The foregoing description of my invention signed by me this 3d day of August, 1877.

NICHOLAS H. BORGFELDT.

Witnesses:
 JAMES TURK,
 ERNEST C. WEBB.